United States Patent
Dodd, Jr. et al.

(10) Patent No.: US 6,505,086 B1
(45) Date of Patent: Jan. 7, 2003

(54) XML SENSOR SYSTEM

(76) Inventors: William A. Dodd, Jr., 207 Foxfire Ct., Clearwater, FL (US) 34621; Donald S. Wilde, PMB 117, 1380 Rio Rancho Blvd. SE., Rio Rancho, NM (US) 87124-1006

( * ) Notice: Subject to any disclaimer, the term of this patent is extended or adjusted under 35 U.S.C. 154(b) by 0 days.

(21) Appl. No.: 09/682,275

(22) Filed: Aug. 13, 2001

(51) Int. Cl.⁷ .............................................. G05B 19/18
(52) U.S. Cl. .............................. 700/65; 700/66; 700/19; 700/20; 700/174; 700/168; 700/169; 703/21; 703/24; 370/349; 340/686.1; 340/988; 340/993; 340/511; 340/531
(58) Field of Search .................... 700/17–20, 65–66, 700/108, 109, 110, 174, 83–88, 168, 169, 170, 173, 181; 703/21, 24; 370/349; 340/686.1, 988, 989, 990, 991, 993, 539, 854.6, 870.16, 870.21, 511, 531, 825.69, 825.72, 825.5

(56) References Cited

U.S. PATENT DOCUMENTS

| | | | |
|---|---|---|---|
| 5,132,968 A | | 7/1992 | Cephus |
| 5,371,487 A | | 12/1994 | Hoffman et al. |
| 5,553,269 A | | 9/1996 | Nunes |
| 5,576,972 A | * | 11/1996 | Harrison ..................... 702/128 |
| 5,673,252 A | | 9/1997 | Johnson et al. |
| 5,852,351 A | | 12/1998 | Canada et al. |
| 5,907,491 A | | 5/1999 | Canada et al. |
| 5,963,679 A | * | 10/1999 | Setlak ......................... 382/115 |
| 6,112,126 A | * | 8/2000 | Hales et al. .................. 700/28 |
| 6,115,654 A | | 9/2000 | Eid et al. |
| 6,131,067 A | * | 10/2000 | Girerd et al. ............... 340/989 |
| 6,204,772 B1 | | 3/2001 | DeMay et al. |
| 6,208,247 B1 | | 3/2001 | Agre et al. |
| 6,305,009 B1 | * | 10/2001 | Goor ........................... 717/116 |
| 6,326,982 B1 | * | 12/2001 | Wu et al. ..................... 345/717 |

OTHER PUBLICATIONS

US 2001/0019420 A1, Sanbongi et al., Sep. 6, 2001, Image Processing System.*
US 2001/0032025 A1, Lenz et al., Oct. 18, 2001, System and Method for Monitoring and Control of Processes and Machines.*
US 2001/0033567 A1, Frati, Oct. 25, 2001, Device for Providing Services and for Home Transmission of Data in the Home.*
Us 2001/0044588 A1, Mault, Nov. 22, 2001, Monitoring System.*
US 2001/0049471 A1, Suzuki et al., Dec. 6, 2001, Life Support Apparatus and Method for Providing Advertisement Information.*
US 2002/0019584 A1, Schultze et al., Feb. 14, 2002, Wireless Interenet Bio–Telementry Monitoring System and Interface.*
US 2002/0035403 A1, Clark et al., Mar. 21, 2002, Method and Apparatus for Remotely Monitoring and Controlling a Pool or Spa.*
US 2002/0041240 A1, Ikeda et al., Apr. 11, 2002, Status Notification System, Apparatus and Response Apparatus.*
US 2002/0059178 A1, Hirabayashi et al., May 16, 2002, Information Managament Method and Apparatus.*
US 2002/0059030 A1, Otworth et al., May 16, 2002, Method and Apparatus for Processing Remotely Collected Information.*

(List continued on next page.)

Primary Examiner—Ramesh Patel
(74) Attorney, Agent, or Firm—Anton J. Hopen; Molly L. Sauter; Smith & Hopen, PA

(57) ABSTRACT

A sensor communication system comprising an array of sensors adapted to transmit sensor data in extensible markup language (XML) format to be received by a data server, the data server communicating the sensor data to a data store and the data store further communicating the sensor data to a data reporting device.

21 Claims, 8 Drawing Sheets

OTHER PUBLICATIONS

Smith, Clint, Wireless Telecom FAQs, 2001, McGraw–Hill, New York.

Baartse, Mark et al., Professional ASP XML, 2000, Wrox Press Ltd., United Kingdom.

Taylor, H. Rosemary, Data Acquisition for Sensor Systems, 1997, Chapman & Hall, London.

Bentham, Jeremy, TCP/IP Lean Web Servers for Embedded Systems, 2000, CMP Books, Kansas, United States.

Fifth IEEE TC–9/NIST Workshop on Smart Transducer Interface Standards IEEE P1451, Conference Proceedings Nov. 15–17, 1995, NIST U.S. Department of Commerce.

* cited by examiner

PRIOR ART

FIG. 8

```
<?xml version="1.0" encoding="UTF-8" ?>
- <item type="GolfCarSensor">
  <bank>00</bank>
  <addr>01</addr>
  <count1>00001950</count1>
  <count2>00006850</count2>
  <count3>00406871</count3>
  <count4>00006850</count4>
  <count5>00004321</count5>
  </item>
```

XML SENSOR SYSTEM

BACKGROUND OF THE INVENTION

1. Field of the Invention

This invention relates to a communications system for sensors, and more particularly, a system for passing sensor data to a remote network location in extensible markup language.

2. Background of the Invention

Data sensors are employed in virtually every major industry. For simple applications, a single sensor may be employed. However, for sophisticated monitoring tasks, a variety of measurements may be conducted including, but not limited to, temperature, pressure, rotation, salinity, acidity, mass, radiation, and the like. Furthermore, computer analysis of sensor data generally requires the processing of analog data into a digital format. Which digital format is employed can often be an important subject of concern.

The computer analysis of sensor data is generally best accomplished when a standardized format is adhered to. Industry groups such as the Institute for Electrical and Electronics Engineers (IEEE) invest substantial effort and resources towards providing well-accepted standards. Nevertheless, engineers still must grapple with the incompatibilities of a heterogeneous array of sensors prior to obtaining meaningful data. Attempts have been made to advance the art and address the problem of incompatible sensors.

U.S. Pat. No. 5,132,968 to Cephus describes a data acquisition system which can acquire data from many different sensor sources (20, 22, 24, 26, 28, 30, 32, 34, 36, 38, 40, 42, 44, 46), data generated by the sensors is sent to a microcontroller (48). A host computer (12) signals the microcontroller (48) to read or control the sensors (20, 22, 24, 26, 28, 30, 32, 34, 36, 38, 40, 42, 44, 46) by wireless transmission through a radio transceiver system (52). The data from the sensors is then sent to the host computer (12) wherein it is decoded for display. The heterogeneous data received from the plurality of sensors in the Cephus patent is standardized by the microcontroller (48). However, both configuration of the microcontroller and decoding on the host computer (12) of the Cephus patent is necessary.

U.S. Pat. No. 5,553,269 to Nunes describes an apparatus for monitoring sensor information from different types of sources wherein a converter (314) converts data bits of sensor input to a format compatible with a computer terminal (330).

Another problem in the current art is that of bandwidth and processing for transmitting sensor data. For a large number of applications that do not have real-time requirements, it is more efficient to aggregate sensor data for a predetermined time period before establishing a transmission.

A heretofore-unfilled need exists for a sensor system that ensures compatibility, data verification and expandability for virtually any analog to digital sensor array. Regardless of source, sensor data should arrive in a format optimized for data analysis and the values contained therein should easily be placed in context without tedious manual configuration. Another need exists for a solution with the above-mentioned properties that provides an efficient use of bandwidth and processing resources to deliver aggregated data.

It is, therefore, to the effective resolution of the aforementioned problems and shortcomings of the prior art that the present invention is directed.

However, in view of the prior art in at the time the present invention was made, it was not obvious to those of ordinary skill in the pertinent art how the identified needs could be fulfilled.

SUMMARY OF INVENTION

The present invention is a sensor communication system comprising a data server means adapted to receive a sensor data file in XML format from an array of sensors, a data store communicatively coupled to the data server means, and a data reporting means communicatively coupled to the data store. The configuration of the network is coordinated and defined by a document type definition.

An inherent advantage to establishing an XML format for the sensor data is that manufacturers, may easily modify existing string output to the tagged XML format in whatever order or configuration they choose. Because document values are classified by a document type definition (DTD), the system becomes a DTD-centric data server device wherein the DTDs are used to map data values without any complicated processing. The XML specification, currently still in version 1.00, is defined by the W3C, World Wide Web Consortium, recommendation (see W3C.org) which is incorporated herein by reference.

A wireless transmitter may be communicatively coupled to the array of sensors, an optional wireless receiver adapted to receive data from the wireless transmitter and a communications link between the wireless receiver and the data server means serves to enable communication between relatively inaccessible points wherein information gathered by the array of sensors is transmitted to the wireless transmitter, to the wireless receiver and to the data server means.

A computer-readable medium communicatively coupled to the data server means and an XML validation module stored on the medium serves to check the validity of the incoming data. In the event the data is invalid, the process is repeated. The XML validation module verifies the sensor data file for well-formedness, verifies the sensor data file against a document type definition, or both.

Additional data integrity may be verified by establishing a first computer-readable medium communicatively coupled to the array of data sensors, a message encapsulation module stored on the first computer-readable medium that encapsulates a data transmission with a checksum, a second computer-readable medium communicatively coupled to the data server and a message checksum validation module stored on the second computer-readable medium that validates the data transmission checksum.

A computer-readable communication variables file stored on the data server is provided which may include a URL, a login ID, a password, a static IP address, a subnet mask ID and a gateway ID. Such variables would be appropriate for a dedicated WAN connection such as a T1 line or DSL. For WAN connections that dynamically allocate IP addresses which are more common for cable modems and analog dial-up connections, the static IP address, subnet mask ID and gateway ID would not be necessary. This file may further contain a data structure defining the topology of the sensor device polling array. Accordingly, the presence of NULL values for such variables would cause the data server to utilize dynamically allocated IP addresses, rather than maintaining a static one. However, it should be noted that static IPs are preferred as they facilitate diagnostic examination of the data server from remote locations.

For analog connections, such as those established by 56 k modems, an ISP dial-up number, ISP login ID and ISP password variables may be included in the communication variables file. This enables the data server to utilize legacy dial-up connections in areas that may not have available digital WAN connections such as cable, DSL, T1 and the like.

In a preferred embodiment of the invention, a configuration server is communicatively coupled to the data server. A computer-readable configuration files stored on the configuration server is established wherein the data server updates the communication variables file according to the configuration file. The benefit to this embodiment is that upon initialization, the data server first establishes a connection to the configuration server and passes on its hard-coded serial number. The serial number, or similar identifier, is associated with table of configuration settings for the particular licensee or user of the system. As the serial numbers are hard-coded into the server, an advanced level of configuration and control of the system is possible without resorting to more complex and expensive remote administration solutions such as those offered by CITRIX SYSTEMS and MICROSOFT TERMINAL SERVICES. Furthermore, the configuration server may be made available to remotely located end-users by WAN connection, preferably a web-based configuration form to which modifications are posted and saved to the configuration server.

In an alternative embodiment of the invention, more direct user control may be made available by permitting an end user to modify the configuration file locally by a console application. However such a method typically involves connecting a monitor and keyboard up to the device, which may be secured in a relatively inaccessible location. A preferred embodiment includes establishing a web server application embedded in the data server such as the ROMAPAGER™ application available from ALLEGRO SOFTWARE DEVELOPMENT CORPORATION of Boxborough, Mass. The web server is accessible through any standard web browser on the LAN to which the data server is connected. A static IP address that is not routed by DNS servers, such as 192.168.1.* may be assigned to the data server to permit easy access. A configuration display page presented by the web server is established wherein changes to the communication variables file are made responsive to user modifications of the configuration display page.

As indicated above, high-speed access to WANs is not universally available. Cable modems, DSL, T1 and other forms of direct, high speed access are typically interfaced through an Ethernet connection which generally runs between 10 to 100 megabits per second. Should such connections be available, an Ethernet interface would be coupled to the data server, the Ethernet interface adapted to establish communications with the data store. In the event that such high speed connections are not available, an analog modem may be coupled to the data server, the analog modem adapted to establish communications with the data store.

In a preferred embodiment of the invention that provides enhanced redundancy and more flexible installations, a primary Ethernet interface is coupled to the data server, the primary Ethernet interface adapted to establish communications with the data store. A secondary analog modem is coupled to the data server, the secondary analog modem adapted to establish communications with the data store. Finally, a computer-readable device control module is stored on the data server that first attempts to connect the data server to the data store through the primary Ethernet interface and upon failure to connect, then attempts to connect the data server to the data store through the secondary analog modem.

In an exemplary application of the invention, the sensors are coupled to a plurality of mechanical devices. Examples of devices might be washing machines in a public Laundromat, thermoplastic injection molding machines, golf course cars, industrial lathes and the like. The mechanical devices most applicable are those that are subject to substantially continuous use. The array of sensors are adapted to quantify the usage and status of the mechanical devices. A data server means is provided to receive a sensor data file from the array of sensors. A data store is communicatively coupled to the data server means to accept and record data throughput. A device rotation algorithm is communicatively coupled to the data store, the algorithm is adapted to report over-usage and under-usage of the mechanical devices. A reporting means for recommending the rotation of the plurality of mechanical devices is then provided to an end user in order to properly balance the use of the mechanical devices.

It is to be understood that both the foregoing general description and the following detailed description are explanatory and are not restrictive of the invention as claimed. The accompanying drawings, which are incorporated in and constitute part of the specification, illustrate embodiments of the present invention and together with the general description, serve to explain principles of the present invention.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF DRAWINGS

For a fuller understanding of the nature and objects of the invention, reference should be made to the following detailed description, taken in connection with the accompanying drawings, in which:

FIG. 8 is an illustrative XML architecture utilized by the invention.

DETAILED DESCRIPTION

Figure 1:
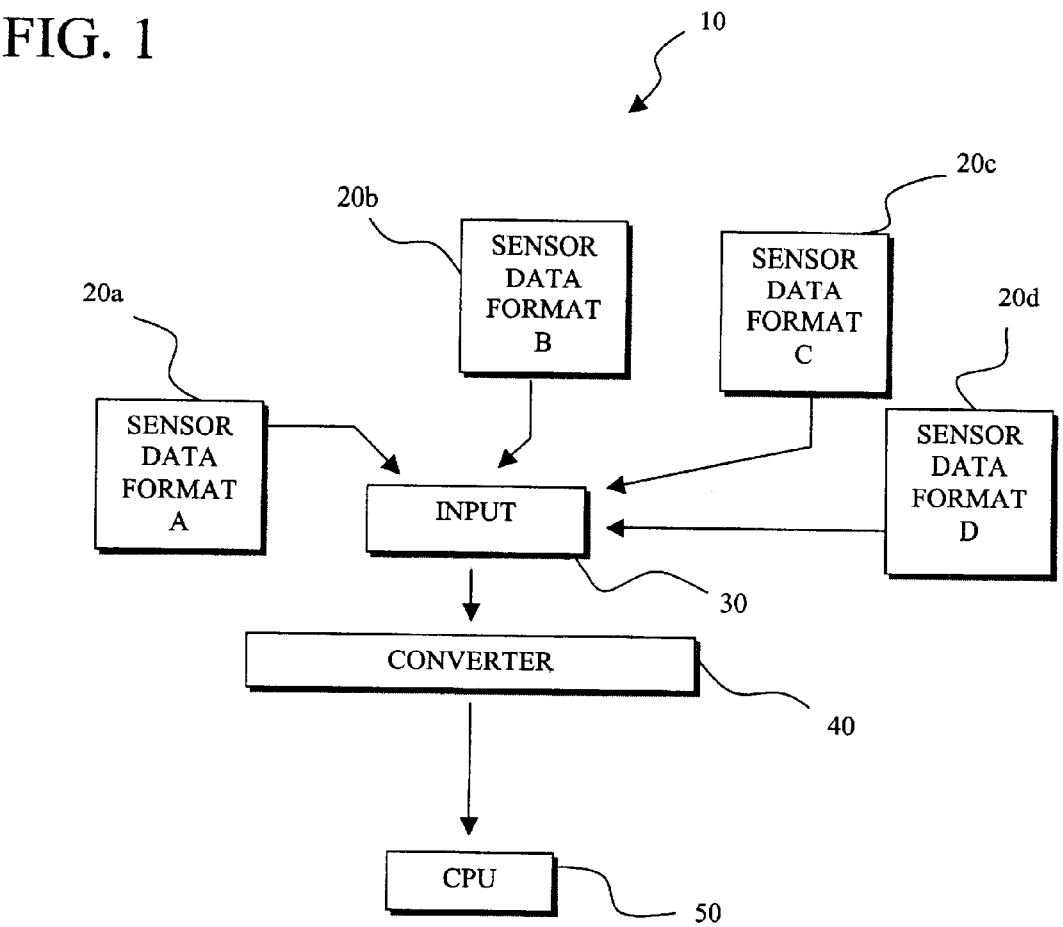
FIG. 1 is a diagrammatic view of the prior art.

FIG. 1 shows an illustrative example of the prior art 10 wherein a heterogeneous array of sensor data formats 20a–20d are received by an input means 30. The data is then subject to conversion 40 before processing 50. The converter 40 is analogous to the microcontroller-multiplexer system (48*a*) of the Cephus patent and the converter (314) of the Nunes patent described previously. The prior art advances did not go so far as to describe or suggest a system to provide a conduit for sensor data that insures proper transmission of the binary data, as well as providing a means to add context to the data values that are received.

Figure 2:
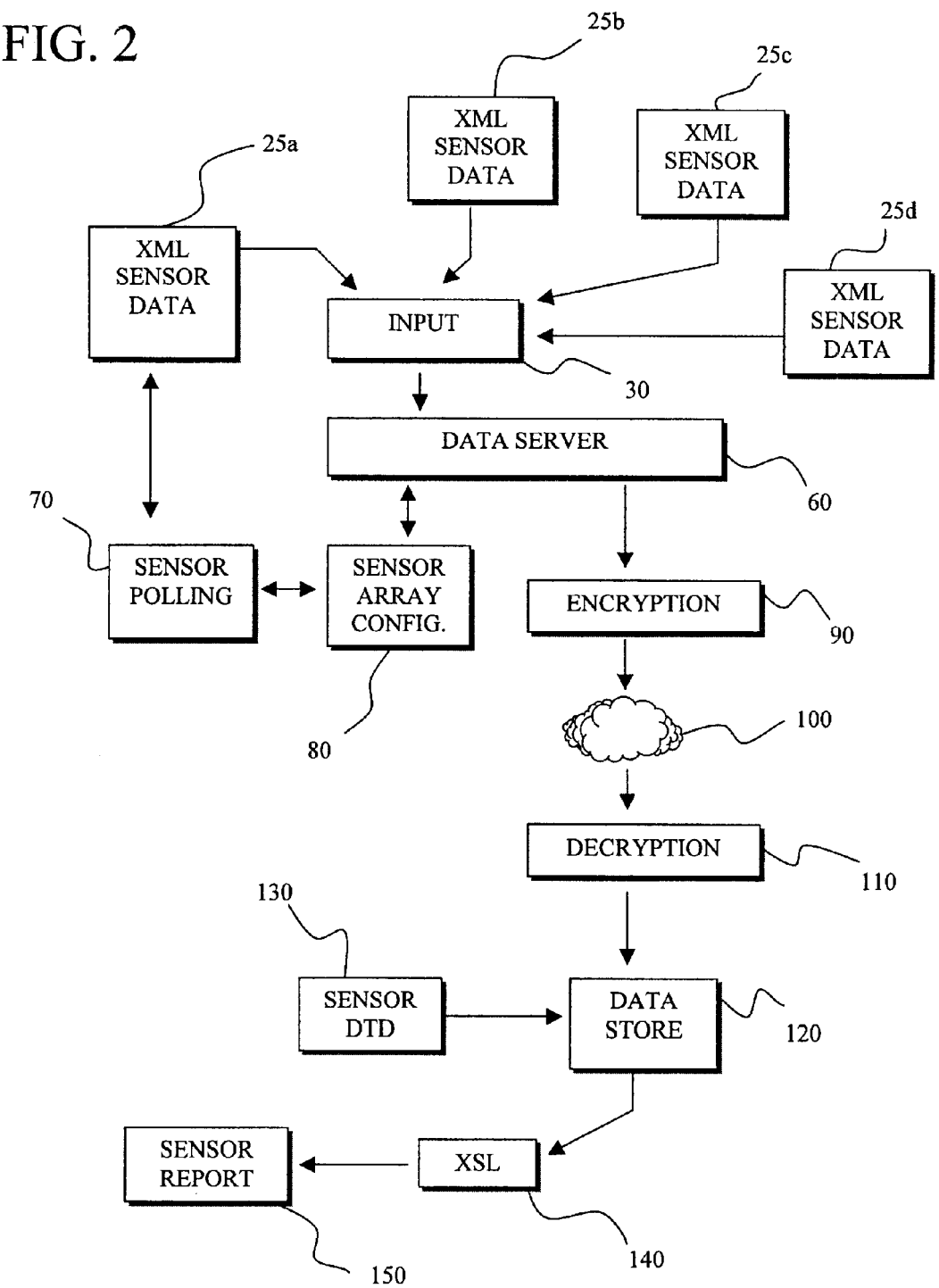
FIG. 2 is a diagrammatic view of the invention.

In FIG. 2, a plurality of XML sensor data streams 25*a*–25*d* are received by an input means 30 communicatively coupled to a data server 60. The input means 30 may be a connection in the form of a parallel power, serial port, USB, 1394, Ethernet or the like. A data server 60 receives the data through the input means 30. A sensor array configuration file 80 may be accessed by the data server 60 or the MTU 170 of FIG. 3 to initiate a sensor polling means 70 to verify the presence of each sensor specified in the sensor array configuration file 80. The sensor polling means 70 is particularly useful when the sensors are affixed to valuable assets such as vehicles or machinery. The absence of a response to the polling function could suggest the asset has been improperly removed from the area or is no longer functioning. As the data server 60 receives the XML data, it may be aggregated into packets of information which are subject to an encryption process 90. In a preferred embodiment of the invention, RSA public key cryptography such as secure socket shell (SSH) is employed for both the connection and authentication. The data may travel through a WAN 100 such as the Internet wherein it undergoes a decryption process 110 prior to residing in a data store 120. As the data is received by the data store 120, it may undergo addition integrity tests such as validating the document for well-formedness or against the document type definitions for the sensor 130. In order to better present the data in comprehensible form, the XML data is applied against an extensible style language (XSL) specification 140 to render a sensor report 150.

Figure 3:
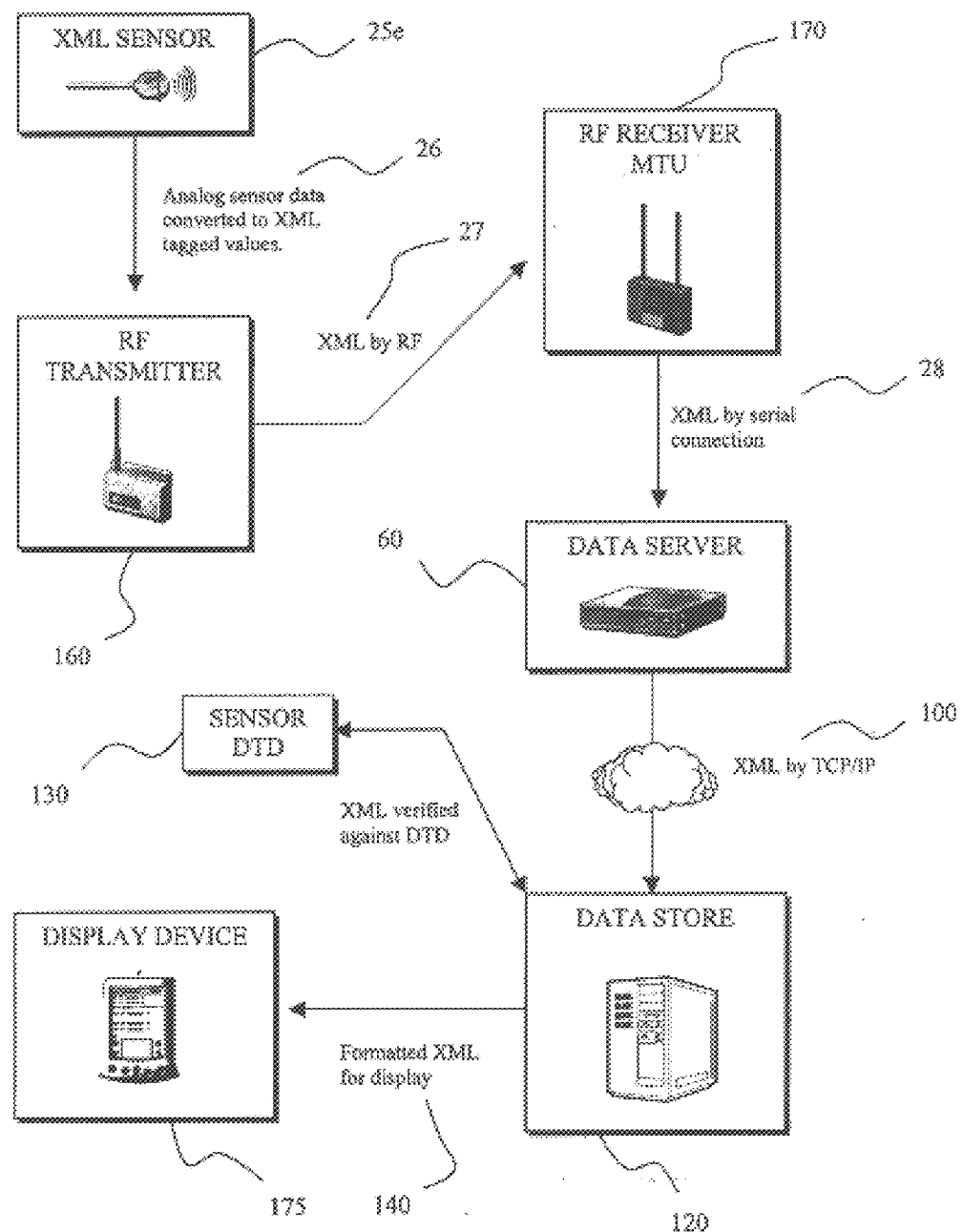
FIG. 3 is a diagrammatic view of a preferred embodiment of the invention.

In FIG. 3, a wireless embodiment of the invention is provided wherein the XML sensor 25*e* converts analog sensor data to XML tagged values 26 according to the predefined sensor DTD 130. A radio frequency transmitter 160 communicatively coupled to the XML sensor 25*e* sends an wireless transmission 27 to a radio frequency receiving master telemetry unit (MTU) 170. The MTU 170 communicates via serial connection 28 with the data server 60. XML data is transported by TCP/IP 100 to a data store 120, verified against the sensor DTD 130, formatted by display 140 and presented on a display device 175. A particular advantage of utilizing the XML format is that it can accommodate a wide variety of display devices that have highly variable display capabilities. XSL templates may be applied to the same XML file to achieve formatting appropriate for different devices. For example, a Palm Pilot® manufactured by 3COM typically has less display area than a standard desktop computer. Accordingly, a Palm Pilot® XSL template may be created to optimize the display for that device, while a second XSL template may be employed for a desktop display.

Figure 4:
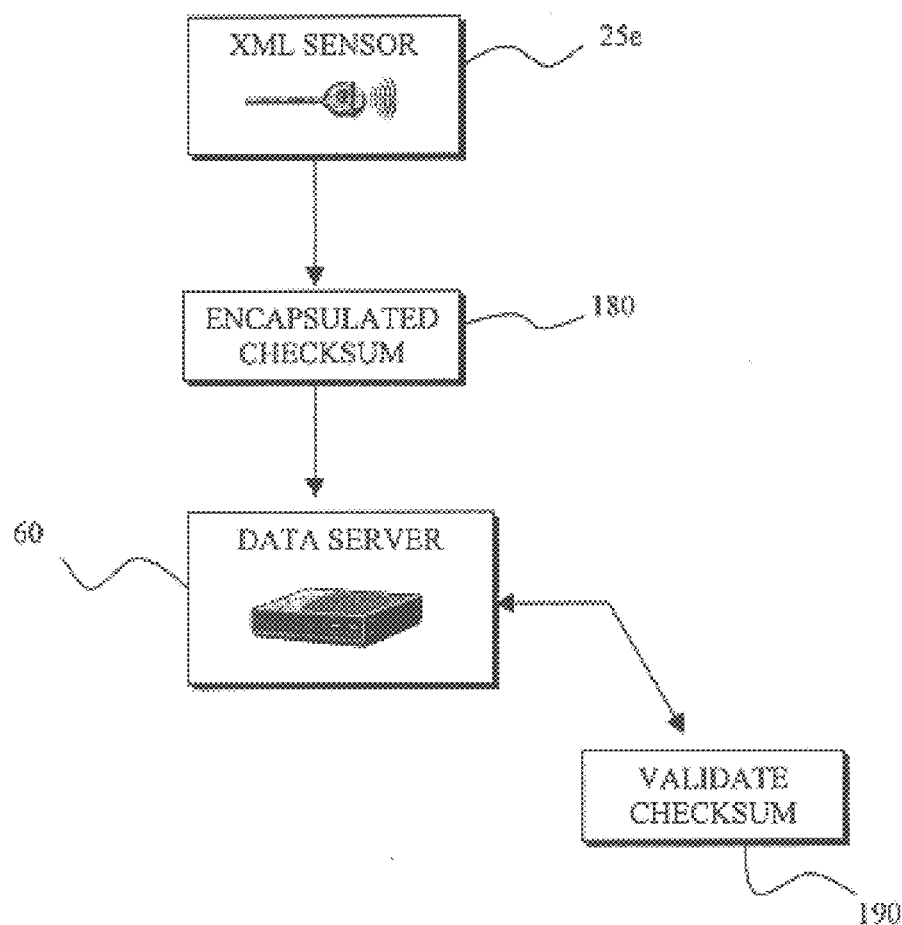
FIG. 4 is a diagrammatic view of a checksum validation sequence according to the invention.

In FIG. 4, an XML sensor 25*e* transmits its data in an encapsulated checksum 180 to the data server 60. The data server 60, then validates the checksum 190 to insure the data is valid. A checksum is a count of the number of bits in a transmission unit that is included with the unit so that the receiver can check to see whether the same number of bits arrived. If the counts match, it's assumed that the complete transmission was received.

Figure 5:
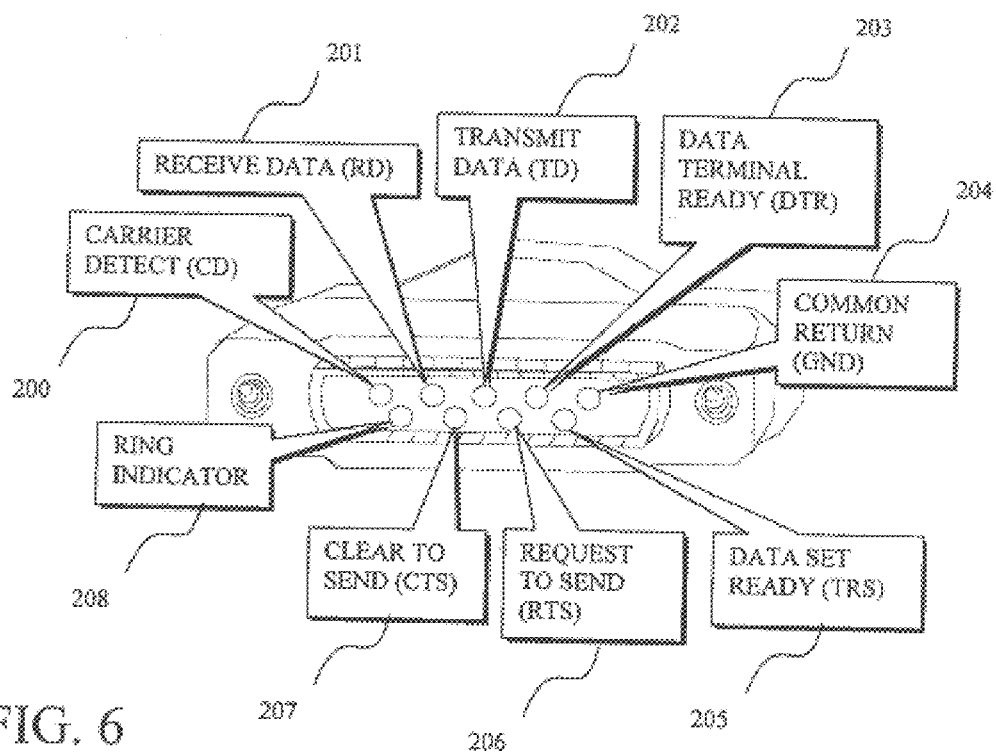
FIG. 5 is a diagrammatic view of a serial port layout according to an embodiment of the invention.

In FIG. 5, an illustrative assignment of serial port lines for a 9-pin connection to the MTU 170 includes a carrier detect 200, receive data 201, transmit data 202, data terminal ready 203, common return 204, data set ready 205, request to send 206, clear to send, 207 and ring indicator 208. The serial port communications should adhere to the RS-232C standard. RS-232C is a long-established standard "C" is the current version) that describes the physical interface and protocol for relatively low-speed serial data communication between computers and related devices. It was defined by an industry trade group, the Electronic Industries Association (EIA), originally for teletypewriter devices. Alternatives to the legacy serial point connections include universal serial bus (USB) and IEEE 1394 connections. USB supports a data speed of 12 megabits per second. This speed will accommodate a wide range of devices, including MPEG video devices, data gloves, and digitizers. IEEE 1394 provides a single plug-and-socket connection on which up to 63 devices can be attached with data transfer speeds up to 400 Mbps (megabits per second). The standard describes a serial bus or pathway between one or more peripheral devices and a computer's microprocessor.

Figure 6:
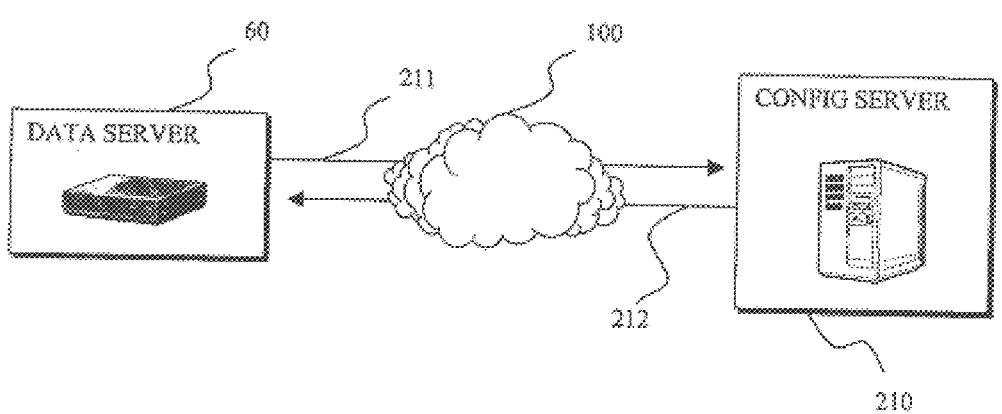
FIG. 6 is a diagrammatic view of a configuration file update according to an embodiment of the invention.

FIG. 6 shows an embodiment of the invention wherein the data server 60 is communicatively coupled via a TCP/IP connection 100 to a configuration server 210. A first request 211 is initiated to the configuration server 210 for a communications variable file. The configuration server 210 then returns 212 the appropriate communications variable file to the data server 60.

Figure 7:
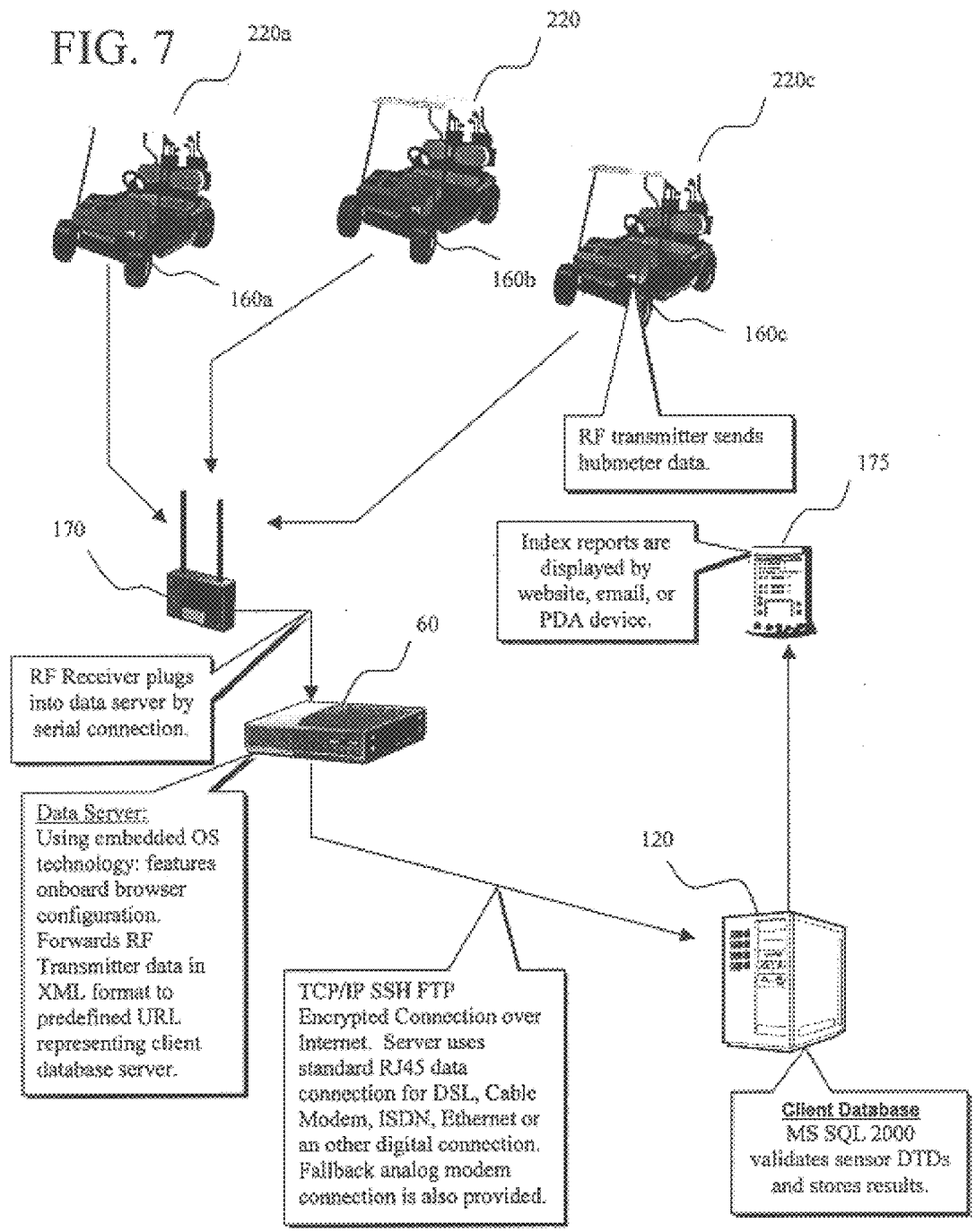
FIG. 7 is a diagrammatic view of an illustrative application of the invention.

FIG. 7 shows an exemplary application of the invention wherein golf car usage is wirelessly monitored, aggregated and transmitted to a data store for analysis. A plurality of golf cars 220*a*–220*c* are fitted with radio frequency transmitters 160*a*–160*c* which transmit axle rotation data to an MTU 170 in XML format. An illustrative example of the XML format is provided in FIG. 8 wherein the sensor data is encapsulated by the sensors as <ITEM> data type in XML-1.0 parlance. A data file from the MTU 170 can consists of any number of item blocks, each of which has a <BANK> and an <ADDR> to identify each sensor, a "type" of "GolfCarSensor" to identify the format, and zero to twenty-four <COUNTxx> variables. These <ITEM> subsections are combined on the Internet Server with the formal DTD and a new "Master" document is created that combines both. As new sensor types are developed, extensions to the Document Type Definition to accommodate the changes can easily be defined. Returning to FIG. 7, the MTU 170 transmits the data by serial connection with the data server 60. A SSH FTP encrypted connection over the Internet transmits the information from the data server 60 to the data store 120 which is shown as the Microsoft SQL 2000 brand software application. From the data store, thin clients such as a PDA 175 can retrieve the XML data in an appropriate display format such as HTML.

Figure 9:
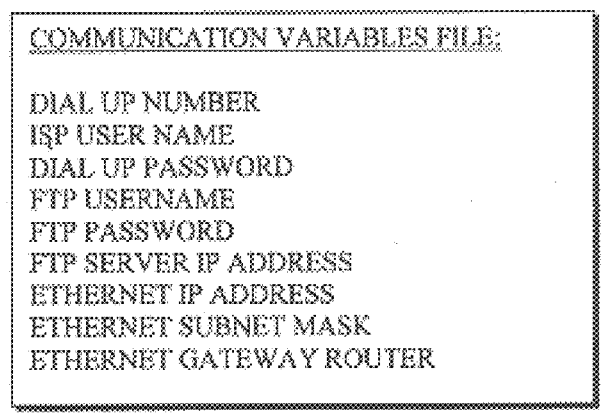
FIG. 9 is a communication variables file according to the invention.

FIG. 9 shows an illustrative example of the fields included with the communication variables file. It should be understood that alternative means of transferring data, such as with a POST command using the HTTP protocol may be employed. The communication variables file should include the target of the data transfer along with the necessary authentication fields required for access to that resource.

Figure 10:
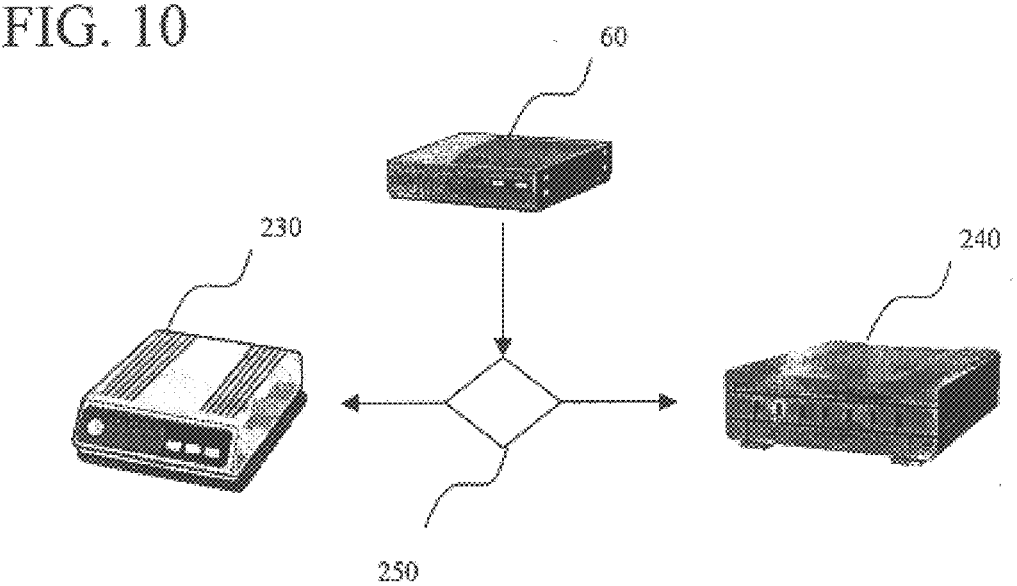
FIG. 10 is a diagrammatic view of a dual digital-analog redundant communication configuration.

FIG. 10 illustrates a computer-readable device control module 250 which is stored on the data server 60 that first attempts to connect the data server 60 through a primary Ethernet interface 240. Upon failure to connect, the module 250 then attempts to connect the data server to the data store through the secondary analog modem 230.

In a preferred embodiment of the invention, the data server system programming is based around a simple command-and-response event loop. As serial commands come in, they are identified and acted on by the data server unit. After power-up and initialization, the MTU initiates all data server activity. The software may include the capability of acquiring additional commands and responding while in the process of performing actions such as dialing the modem, encrypting the message, and sending the data to the data store 120.

A top-level functional program written entirely in C as compiled by the GNU C compiler, version 2.95. The gcc compiler is documented in the GNU info system on a running FreeBSD system and is accessed by typing info gcc at a FreeBSD shell prompt.

Most of the activities are performed using existing programs included with the FreeBSD system, as opposed to raw C code. This is preferred for four reasons: First, direct C code would provide a minimal increase in speed from the ramdisk-resident programs called through system() calls. Second, the use of standard programs leverages existing work and continuing improvements. Third, the use of separate binary tools will enable an easier migration to use of the system's multitasking capability so that the system can stay responsive to serial requests on a continuous basis. Fourth, code reuse is much preferable in prototyping situations.

The gcds system program accesses four ISA-bus resident devices: (1) the sio0 serial port, which provides for the command/data link path to the MTU; (2) the sio1 serial port, which is poked directly as the LED port; (3) the sio3 modem, which also appears as a 16550-based serial port; and (4) the ed0 NE2000-clone Network Interface Card.

The main serial connection on sio0 (accessed as /dev/ttyd0 in BSD nomenclature) is made through direct read and write commands from C. The functions tty_sio() and tty_reset() configure the port.

The custom LED system is accessed by using the special /dev/io device to enable direct hardware access to poke values directly into the UART's control registers.

The modem (accessed as /dev/cuaa3 in BSD nomenclature) is activated and controlled through several system-supplied programs. First, the ppp program handles the modem control functions. It is controlled using a script which is created on the fly by gc using the values in its configuration table. PPP is set to auto-dial upon receiving an internet call, which it will do when the sftp program is called to perform an encrypted transfer. The mode of operation is for the system to access a configuration server through an 800 number and then to receive its local dial-up login information for further activity. Finally, the Ethernet card ed0 is accessed through system calls within the kernel when access is required.

The communication between the data server and the content store depends on several protocols. First, the modem dialer connects to an ISP using Hayes modem protocol commands. The data server supplies the ISP with its appropriate username and password and then establishes a transport link using the Point-to-Point Protocol (ppp), as defined in RFC 1661. The actual data transfer is handled using an encrypted form of the Secure File Transfer Protocol (sftp) as driven by the Secure SHell (ssh) encryption engine.

The code of preference is the OpenSSH variant developed by the OpenBSD Project as implemented in the FreeeBSD-4.2 Source Tree. The actual encryption algorithm implemented is a clean-room version of the RSA Security algorithm recently released to the public domain when RSA's patent protection ran out.

In order to reduce costs and space necessary for the data server, an embedded system approach is preferred utilizing Microsoft's Embedded NT, PicoBSD Embedded Version or the like. PicoBSD is a compressed form of FreeBSD designed to fit on a floppy or flash disk. The system bootsfrom the disk, and the first thing the PicoBSD kernel does upon loading is to unravel itself into a complete memory-based version of FreeBSD. In keeping with the nature of PicoBSD systems, some of the advanced features of BSD are turned off, like the virtual memory swapper. PicoBSD is designed for small embedded applications like the data server where only a limited number of tasks will be operating simultaneously and inputs and memory usage can be tightly controlled.

The PicoBSD system, like FreeBSD, is not a "hard real-time" environment. It is designed for applications that are not time-critical but which require access to the multi-tasking capabilities of the BSD OS. A PicoBSD kernel can be compiled with any FreeBSD feature installed or not as chosen by the developer for the task at hand. Even small PicoBSD systems which fit on 1.44M floppies have most of the capabilities and tools of the full FreeBSD distribution, including networking, serial port control, and console display.

For the data server itself, a preferred hardware configuration is a Micro-Computer Systems, Incorporated (MCSI) IRV-686H board. It contains an Intel Pentium 133 MHz processor and a SiS-5598 AT-compatible chipset which implements a VGA controller, two serial ports, IDE and floppy drive interfaces, and a parallel port. The chassis selected is a plain industrial-grade chassis with a small power supply and a three-slot ISA backplane. The FLASH Disk is a 32 MB device that is designed to attach to an IDE connection to the ISA Chipset. It emulates an industry standard ATA command set for ease of integration. The modem selected is a generic Taiwan-manufactured board of the Cirrus Logic "Reference Design" for their V.90 56K modem chipset. As such, it is fully compatible with a large number of modems built with the same chip. It implements the full Hayes command set as well as a National NS16C550-compatible UART with FIFO buffers. The board is interfaced as /dev/cuaa3 on interrupt Int 5, ISA port address 0x2E8, which corresponds to the PC address COM4.

It is preferred that the Ethernet Network Interface Card selected is a clone of the popular industry standard Novell NE-2000 type, which is available from a number of manufacturers. The Addtron AE200PNP is one of the better generics, as it still has jumper configuration and an RG-58 connection for coaxial Ethernet, as well as the currently popular RJ45 modular connector utilized in CAT-5 10Base-T networks. The board is interfaced as /dev/ed0, at interrupt Int 10, ISA port 0x300, with a 16K ROM block opening mapped to 0xB8000.

It will be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described.

What is claimed is:

1. A sensor communication system comprising:
   at least one sensor adapted to transmit a sensor data file in XML format;
   a data server means adapted to receive the sensor data file from the at least one sensor;
   a data store communicatively coupled to the data server means; and
   a data reporting means communicatively coupled to the data store.

2. The system of claim 1 further comprising:
   a wireless transmitter communicatively coupled to the at least one sensor, wherein the wireless transmitter is adapted to transmit the sensor data file;
   a wireless receiver adapted to receive the sensor data file from the wireless transmitter; and
   a communications link between the wireless receiver and the data server means.

3. The system of claim 1 further comprising:
   a computer-readable medium communicatively coupled to the data server means; and
   an XML validation module stored on the computer-readable medium.

4. The system of claim 3 wherein the XML validation module verifies the sensor data file for well-formedness.

5. The system of claim 3, further comprising:
   document type definitions stored on the computer-readable medium, whereby the XML validation module compares the document type definitions against the sensor data file.

6. The system of claim 1 further comprising:
   a first computer-readable medium communicatively coupled to the at least one data sensor;
   an XML encapsulation module stored on the first computer-readable medium that encapsulates the sensor data file with a checksum;
   a second computer-readable medium communicatively coupled to the data server means; and
   a checksum validation module stored on the second computer-readable medium that validates the sensor data file checksum.

7. The system of claim 1 further comprising a computer-readable communication variables file stored on the data server.

8. The system of claim 7 wherein the communication variables file comprises a URL, a login ID and a password.

9. The system of claim 8 wherein the communication variables file further comprises a static IP address, a subnet mask ID and a gateway ID.

10. The system of claim 8 wherein the communication variables file further comprises an ISP dialup number, an ISP login ID and an ISP password.

11. The system of claim 8 where the communication variables file further comprises a data structure defining the topology of the at least one data sensor.

12. The system of claim 7 further comprising:
    a configuration server communicatively coupled to the data server; and
    a computer-readable configuration file stored on the configuration server wherein the data server updates the communication variables file according to the configuration file.

13. The system of claim 7 further comprising:
    a web server embedded in the data server;
    a configuration display page presented by the web server wherein changes to the communication variables file are made responsive to user modifications of the configuration display page.

14. The system of claim 1 further comprising an analog modem coupled to the data server, the analog modem adapted to establish communications with the data store.

15. The system of claim 1 further comprising an Ethernet interface coupled to the data server, the Ethernet interface adapted to establish communications with the data store.

16. The system of claim 1 further comprising:
    a primary Ethernet interface coupled to the data server, the primary Ethernet interface adapted to establish communications with the data store;
    a secondary analog modem coupled to the data server, the secondary analog modem adapted to establish locations with the data store; and
    a computer-readable device control module stored on the data server that first attempts to connect the data server to the data store through the primary Ethernet interface and upon failure to connect, then attempts to connect the data server to the data store through the secondary analog modem.

17. A sensor communication system comprising:
    at least one data sensor coupled to at least one mechanical device, the at least one data sensor adapted to quantify the usage and status of the at least one mechanical device;
    a data server means adapted to receive a sensor data file from the at least one data sensor;
    a data store communicatively coupled to the data server means;
    a device rotation algorithm communicatively coupled to the data store, the algorithm adapted to report over-usage and under-usage of the at least one mechanical device; and
    a reporting means for recommending the rotation of the at least one mechanical device.

18. The sensor communication system of claim 17 wherein the sensor data files are formatted in XML.

19. The sensor communication system of claim 18 wherein the sensor data file is validated against a DTD.

20. The sensor communication system of claim 18 wherein the sensor data file is validated for well-formedness.

21. A method of aggregating sensor data comprising the steps of:
    establishing an XML sensor specification;
    establishing a DTD for each sensor manufactured under the XML sensor specification;
    saving the DTD on a computer readable medium;
    establishing a data server adapted to receive an array of sensor data, the data server communicatively coupled to the computer readable medium;
    validating the array of sensor data against the DTD on the computer readable medium.

* * * * *